United States Patent Office 3,082,206
Patented Mar. 19, 1963

3,082,206
NOVEL 4-(p-AMINOBENZENESULPHONAMIDO)-
2:6-DIPHENOXYPYRIMIDINES
Bernard William Langley, Macclesfield, England, assignor to Imperial Chemical Industries Limited, London, England, a corporation of Great Britain
No Drawing. Filed Nov. 2, 1959, Ser. No. 850,026
Claims priority, application Great Britain Dec. 8, 1958
2 Claims. (Cl. 260—239.75)

This invention relates to a manufacturing process and more particularly it relates to the manufacture of pyrimidine derivatives which possess therapeutic properties for example as antibacterial agents.

According to the invention we provide a process for the manufacture of pyrimidine derivatives of the formula:

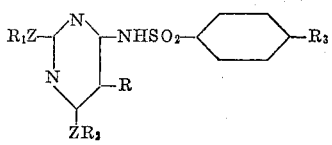

wherein Z stands for an oxygen atom or for a sulphur atom, $R_1$ and $R_2$, which may be the same or different, stand for lower alkyl radicals or phenyl radicals which may optionally be substituted, R stands for hydrogen or for a lower alkyl radical and $R_3$ stands for an amino group or for a group which can be converted into an amino group which comprises interaction of a compound of the formula:

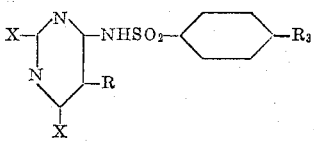

wherein R and $R_3$ have the meanings stated above and wherein X stands for a halogen atom, and a metal derivative of the formula:

Me.Z.$R_4$ wherein Z has the meaning stated above, Me stands for a metal atom and $R_4$ stands for a lower alkyl radical or for a phenyl radical which may optionally be substituted, and thereafter, if necessary, replacing the substituent ($R_3$) by an amino group.

As suitable substituents ($R_3$) which may be converted into an amino group there may be mentioned for example acylamino radicals of the formula —NHCOR′ and alkoxycarbonylamino radicals of the formula —NHCOOR′ wherein R′ stands for an alkyl radical which can be hydrolysed to an amino group and a nitro group or an arylazo radical which can be reduced to an amino group.

Suitable metal derivatives which may be used in the above process are alkali metal alkoxides, alkali metal alkylmercaptides, alkali metal phenates and alkali metal thiophenates for example sodium or potassium methoxide, ethoxide, phenate or thiophenate and sodium or potassium methylmercaptide or ethylmercaptide.

The reaction is conveniently carried out by heating the reactants together in the presence of an inert solvent or diluent for example methanol or toluene.

Conversion of the group ($R_3$) into an amino group for example by hydrolysis may be carried out by heating in an aqueous alkaline medium for example an aqueous medium containing sodium hydroxide or potassium hydroxide. Conversion of the group ($R_3$) into an amino group for example by reduction may be carried out in a medium in which hydrogen is being generated for example in a medium containing tin and dilute aqueous hydrochloric acid.

2:6 - dimethoxy-4-(p-aminobenzenesulphonamido)-pyrimidine and 2:6-dimethoxy-4-(p-acetylaminobenzenesulphonamido)pyrimidine are pyrimidine derivatives of the above stated formula which are known compounds. The remaining compounds of the invention are new compounds.

Thus as a further feature of the invention we provide pyrimidine derivatives of the formula:

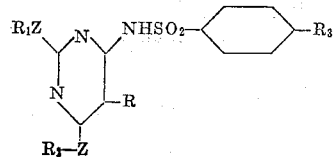

wherein Z, R, $R_1$, $R_2$ and $R_3$ have the meaning stated above, provided that when R stands for hydrogen and $R_3$ stands for an amino or an acetylamino group $R_1$ and $R_2$ do not both stand for methoxyl radicals.

The invention is illustrated but not limited by the following examples in which the parts are by weight:

Example 1

1 part of 2:6-dichloro-4-(p-acetylaminobenzenesulphonamido)pyrimidine is added to a solution of 0.5 part of sodium in 30 parts of methanol and the mixture is heated under reflux for 16 hours. The methanol is removed by distillation and the residue is then heated under reflux with a solution of 1 part of sodium hydroxide in 16 parts of water. The mixture is cooled and acidified with dilute aqueous hydrochloric acid and filtered. The filtrate is adjusted to pH 5–6 by the addition of aqueous sodium acetate solution and the mixture so obtained is filtered. The solid residue is washed with water and crystallised from aqueous ethanol. There is thus obtained 2:6 - dimethoxy - 4 - (p-aminobenzenesulphonamido)pyrimidine, M.P. 200–201° C.

Example 2

3.9 parts of 2:6-dichloro-4-(p-ethoxycarbonylaminobenzenesulphonamido)pyrimidine are dissolved in a solution of 1–2 parts of sodium in 50 parts of methanol and the mixture is heated under reflux for 20 hours. The methanol is evaporated in vacuo and the residue is dissolved in 50 parts of 8% w./v. aqueous sodium hydroxide solution and is heated under reflux for 90 minutes. The reaction mixture is decolourised with charcoal and filtered and the filtrate is adjusted to pH 5–6 by the addition of acetic acid. The mixture is filtered and the solid residue is washed with water and crystallised from aqueous methanol. There is thus obtained 2:6-dimethoxy-4-(p-aminobenzenesulphonamido)pyrimidine M.P. 200–201° C.

Example 3

2 parts of 2:6-dichloro-4-(p-phenylazobenzenesulphonamido)pyrimidine are dissolved in a solution of 0.6 part of sodium in 25 parts of methanol and the mixture is heated under reflux for 24 hours. The methanol is evaporated in vacuo and the residue is dissolved in 100 parts of 4% w./v. aqueous sodium hydroxide solution. The solution is acidified to pH 1–2 with concentrated hydrochloric acid and filtered. The solid residue is then dissolved in 100 parts of 4% w./v. aqueous sodium hydroxide solution and is reprecipitated by acidification of the solution to pH 1–2 with concentrated hydrochloric acid. The solid product so obtained is 2:6-dimethoxy-4 - (p-phenylazobenzenesulphonamido)pyrimidine, M.P. 82.5–84° C.

Example 4

1.5 parts of 2:6-dimethoxy-4-(p-phenylazobenzenesulphonamido)pyrimidine and 4 parts of clean tin are suspended in 10 parts of 14.6% w./v. hydrochloric acid and the mixture is stirred and heated at 50° C. until a colourless supernatant solution is obtained. The solution is decanted from the excess tin and is made alkaline by the additions of 8% w./v. aqueous sodium hydroxide and the mixture is filtered. The filtrate is acidified to pH 5–6 by the addition of acetic acid and filtered. The solid residue is digested with 10 parts of boiling methanol, the mixture is filtered and the filtrate is diluted with 10 parts of water and cooled. There is thus obtained 2:6-dimethoxy-4-(p-aminobenzenesulphonamido)pyrimidine, M.P. 200–201° C.

*Example 5*

3.45 parts of 2:6-dichloro-4-(p-acetamidobenzenesulphonamido)pyrimidine are dissolved in a solution of 1.13 parts of sodium in 50 parts of ethyl alcohol and the mixture is heated under reflux for 4 days. The ethanol is evaporated in vacuo and the residue is dissolved in 50 parts of 8% w./v. aqueous sodium hydroxide solution and is heated under reflux for 90 minutes. The reaction mixture is treated with decolourising carbon and filtered and the filtrate is acidified to pH 5–6 by adding acetic acid. The precipitated solid is crystallised from aqueous acetone and there is thus obtained 2:6-diethoxy-4-(p-aminobenzenesulphonamido)pyrimidine, M.P. 194–197° C.

*Example 6*

To a solution of 1.84 parts of sodium in 50 parts of methanol are added 5.8 parts of methylmercaptan and 7.2 parts of 2:6-dichloro-4-(p-acetamidobenzenesulphonamido)pyrimidine, and the mixture is heated under reflux for 20 hours. After removal of the methanol, hydrolysis with 8% w./v. aqueous sodium hydroxide and acidification with acetic acid is carried out in the manner described in Example 5. The precipitated solid is crystallised from aqueous ethanol and there is obtained 4-(p-aminobenzenesulphonamido) - 2:6-dimethylthiopyrimidine, M.P. 162–164° C.

*Example 7*

7.2 parts of 2:6-dichloro-4-(p-acetamidobenzenesulphonamido)pyrimidine are added to a solution of 1.8 parts of sodium in 40 parts of phenol. The mixture is heated at 100° C. for 20 hours and then at 120° C. for a further 4 hours. After removal of the solvent in vacuo, the residue is heated under reflux in 50 parts of 8% w./v. aqueous sodium hydroxide for 2 hours. The hot solution is clarified with charcoal and filtered and the filtrate is adjusted to pH 5–6 with acetic acid. The gummy precipitate is separated by decantation, dissolved in 25 parts of methanol and is reprecipitated by the addition of 10 parts of water. The crystalline product is separated by filtration and is recrystallised from aqueous β-ethoxyethanol. There is thus obtained 4-(p-aminobenzenesulphonamido)2:6 - diphenoxypyrimidine, M.P. 258–260° C.

*Example 8*

4.5 parts of 2:6-dichloro-4-(p-acetamidobenzenesulphonamido)-5-methylpyrimidine are dissolved in a solution of 1.4 parts of sodium in 75 parts of methanol, and the mixture is heated under reflux for 20 hours. The solvent is removed in vacuo and the residue is hydrolysed by heating under reflux in 75 parts of 8% w./v. aqueous sodium hydroxide for 90 minutes. The solution is clarified with charcoal and filtered and the filtrate is adjusted to pH 5–6 with acetic acid. The mixture is filtered and the solid residue is crystallised from aqueous ethanol. There is thus obtained 4-(p-aminobenzenesulphonamido)-6-chloro-2-methoxy-5-methylpyrimidine, M.P. 98–102° C.

*Example 9*

0.7 part of 4-(p-aminobenzenesulphonamido)-6-chloro-2-methoxy-5-methylpyrimidine are dissolved in a solution of 0.1 part of sodium in 5 parts of methanol, and the mixture is heated at 100° C. for 24 hours. The methanol is evaporated in vacuo and the residue is dissolved in 10 parts of water and the solution is filtered. The filtrate is acidified to pH 5–6 with acetic acid and filtered. The solid is recrystallised three times from 50% aqueous methanol and there is thus obtained 4-(p-aminobenzenesulphonamido) - 2:6-dimethoxy-5-methylpyrimidine, M.P. 201–203° C.

*Example 10*

6.8 parts of 2:6-dichloro-4-(p-acetamidobenzenesulphonamido)pyrimidine are dissolved in a solution of 1.4 parts of sodium in 80 parts of methanol and allowed to stand at 20° C. for 24 hours. The solvent is evaporated in vacuo and 100 parts of water are added to the residue. The resulting solution is adjusted to pH 5–6 with acetic acid and filtered to yield 4-(p-acetamidobenzenesulphonamido)-6-chloro-2-methoxypyrimidine, M.P. 210–215° C. This total product is then dissolved in a solution of 1.4 parts of sodium in 75 parts of ethanol and the mixture is heated under reflux for 24 hours. The solvent is removed in vacuo and the residue is dissolved in 75 parts of 8% aqueous sodium hydroxide and is heated under reflux for 90 minutes. The solution is filtered, after clarifying with carbon, adjusted to pH 5–6 with acetic acid, and filtered. The solid is dissolved in 50 parts of 8% w./v. aqueous sodium hydroxide, filtered and reprecipitated by neutralisation with acetic acid. There is thus obtained 4-(p-aminobenzenesulphonamido)-6-ethoxy-2-methoxypyrimidine, M.P. 144–150° C.

What I claim is:

1. A pyrimidine of the formula:

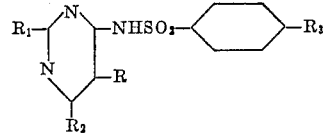

wherein $R_1$ and $R_2$ are phenoxy, R is selected from the group consisting of hydrogen and lower alkyl, and $R_3$ is selected from the group consisting of amino, acetylamino, alkoxycarbonylamino, nitro and phenylazo.

2. 4 - (p-aminobenzenesulphonamido)2:6-diphenoxypyrimidine.

References Cited in the file of this patent

UNITED STATES PATENTS

| | | |
|---|---|---|
| 2,407,966 | Sprague | Sept. 17, 1946 |
| 2,430,439 | Winnek et al. | Nov. 4, 1947 |
| 2,540,356 | Sprague | Feb. 6, 1951 |
| 2,610,187 | Oroshnik | Sept. 9, 1952 |
| 2,703,800 | Bretschneider et al. | Mar. 8, 1955 |
| 2,712,012 | Clark | June 28, 1955 |
| 2,891,953 | Clark et al. | June 23, 1959 |

FOREIGN PATENTS

| | | |
|---|---|---|
| 175,895 | Austria | Aug. 25, 1953 |
| 926,131 | Germany | Apr. 7, 1955 |
| 517,272 | Great Britain | Jan. 25, 1940 |

OTHER REFERENCES

Rose et al.: "Journal Chemical Soc.," (London), pages 81–85 (1946).